US012698051B2

(12) United States Patent
     Tanaka

(10) Patent No.: US 12,698,051 B2
(45) Date of Patent: Aug. 4, 2026

(54) VEHICLE

(71) Applicant: YAMAHA HATSUDOKI KABUSHIKI KAISHA, Iwata (JP)

(72) Inventor: Tatsuya Tanaka, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 806 days.

(21) Appl. No.: 17/851,077

(22) Filed: Jun. 28, 2022

(65) Prior Publication Data

US 2023/0029991 A1 Feb. 2, 2023

(30) Foreign Application Priority Data

Jul. 29, 2021 (JP) ................................. 2021-124626

(51) Int. Cl.
    B62K 5/01 (2013.01)
    B62K 25/04 (2006.01)
(52) U.S. Cl.
    CPC ................ B62K 5/01 (2013.01); B62K 25/04 (2013.01)
(58) Field of Classification Search
    CPC .......... B60G 21/0551; B60G 2200/144; B60G 2204/1222; B60G 2300/07; B60G 2300/124; B62K 5/01; B62K 25/04; B62K 2005/001
    USPC ........................................................ 180/233
    See application file for complete search history.

(56) References Cited

U.S. PATENT DOCUMENTS

2007/0176387 A1* 8/2007 Tsuruta .................. B60G 11/15
                                                        280/124.135
2007/0193813 A1   8/2007 Schlangen et al.

FOREIGN PATENT DOCUMENTS

JP        2015-189310 A     11/2015

OTHER PUBLICATIONS

Tanaka et al., "Vehicle," U.S. Appl. No. 17/851,078, filed Jun. 28, 2022.
Tanaka, "Straddled Vehicle," U.S. Appl. No. 17/851,080, filed Jun. 28, 2022.

* cited by examiner

*Primary Examiner* — Valentin Neacsu
*Assistant Examiner* — Felicia L. Brittman-Alabi
(74) *Attorney, Agent, or Firm* — Keating & Bennett, LLP

(57) ABSTRACT

A vehicle includes a body frame including an upper frame, a front frame, and a rear frame. On a front-wheel side, a first end of a shock absorber of a suspension and a stabilizer are supported by the body frame via a bracket adjacent to a connection between the upper frame and the front frame. On a rear-wheel side, a first end of a shock absorber of a suspension and a stabilizer are supported by the body frame via a bracket adjacent to a connection between the upper frame and the rear frame.

4 Claims, 13 Drawing Sheets

F I G . 1
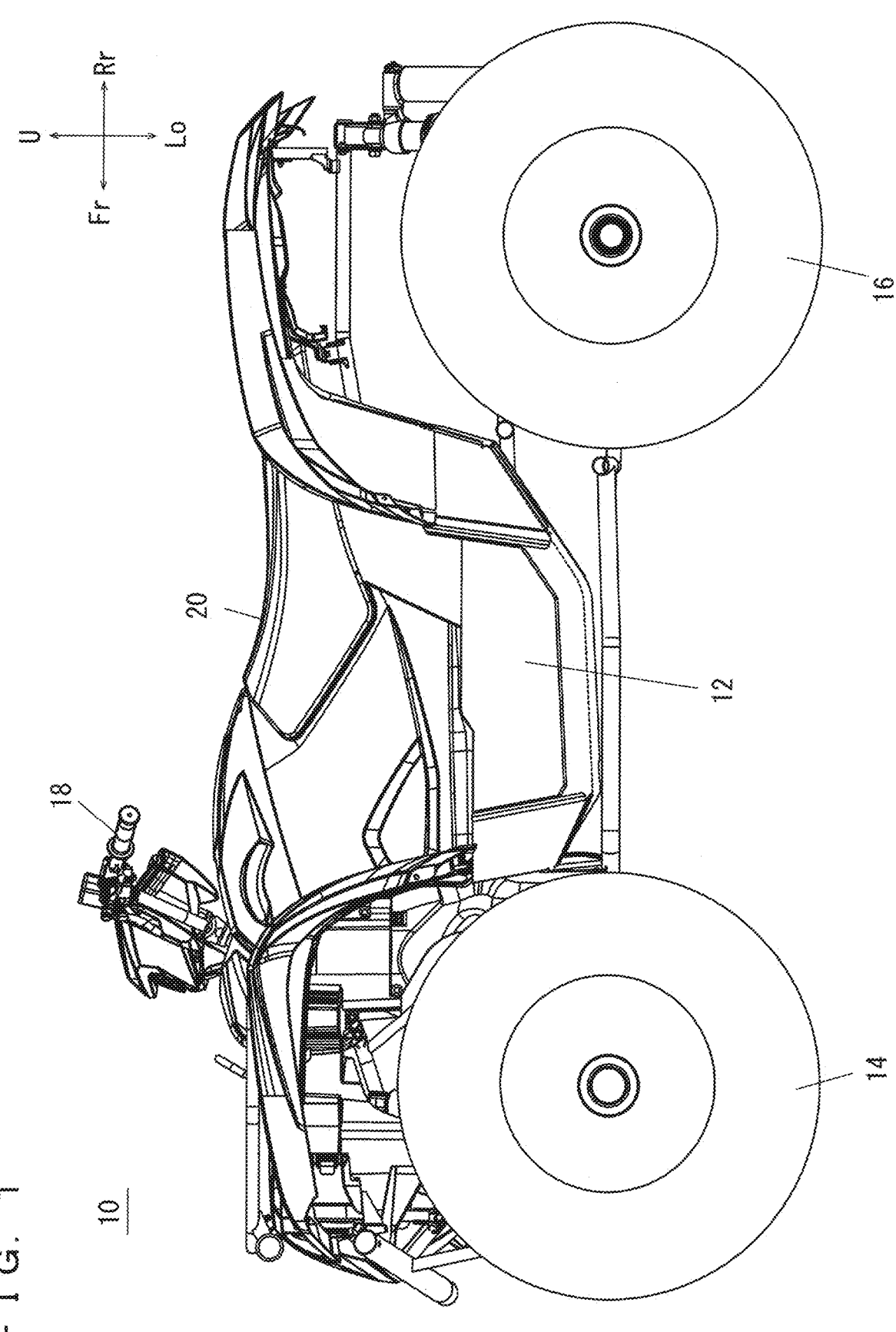

F I G. 4
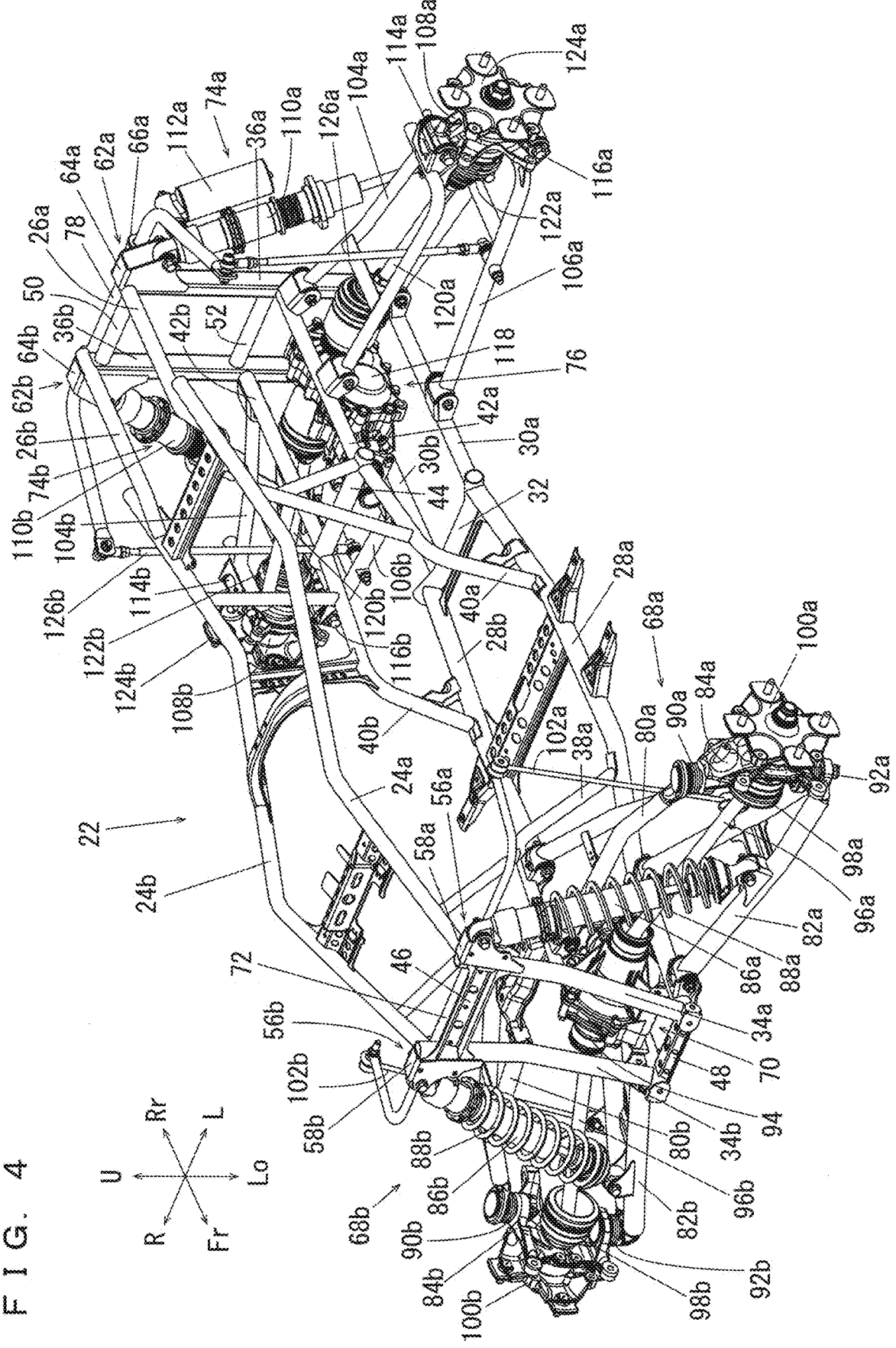

F I G. 5
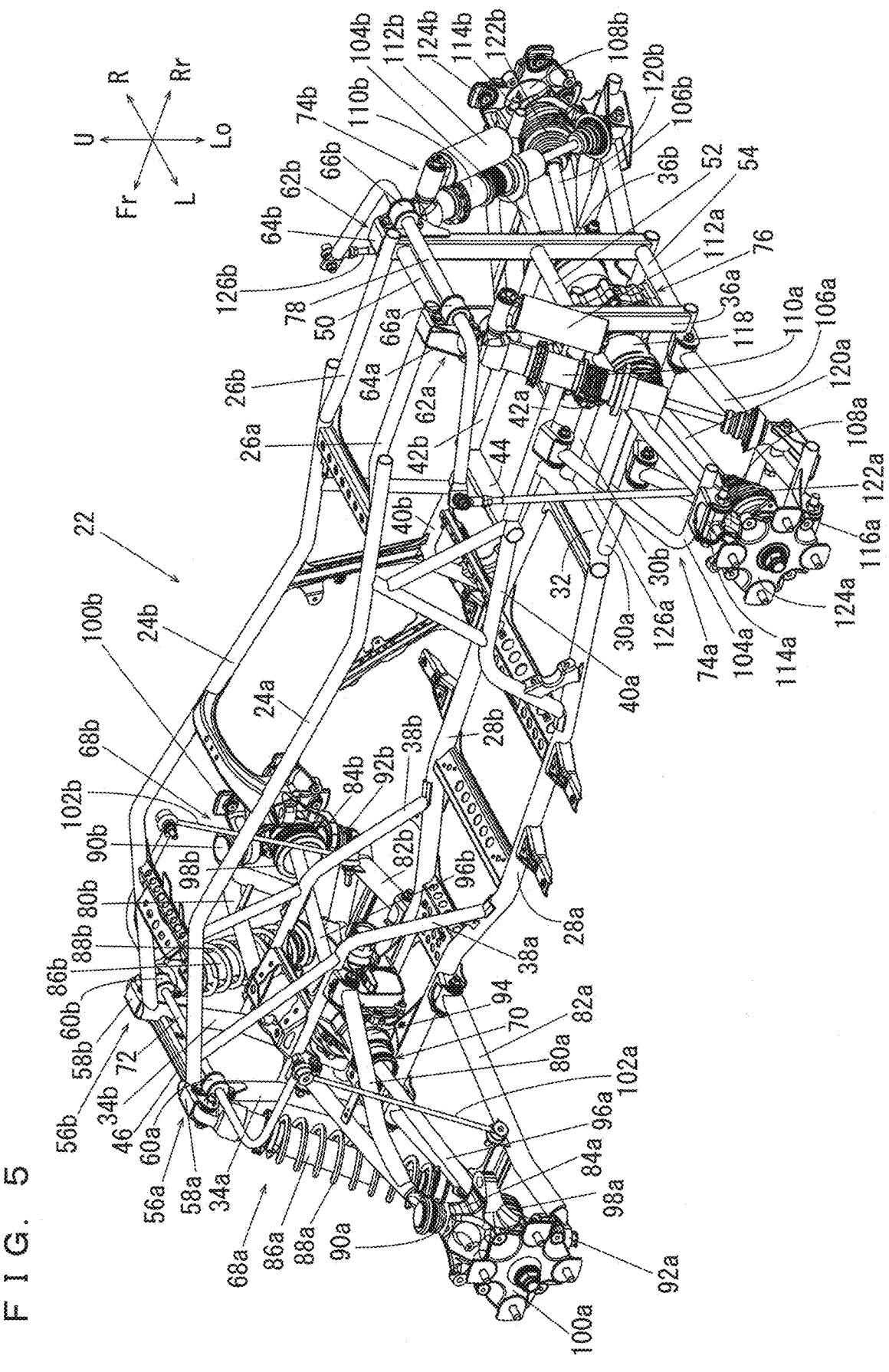

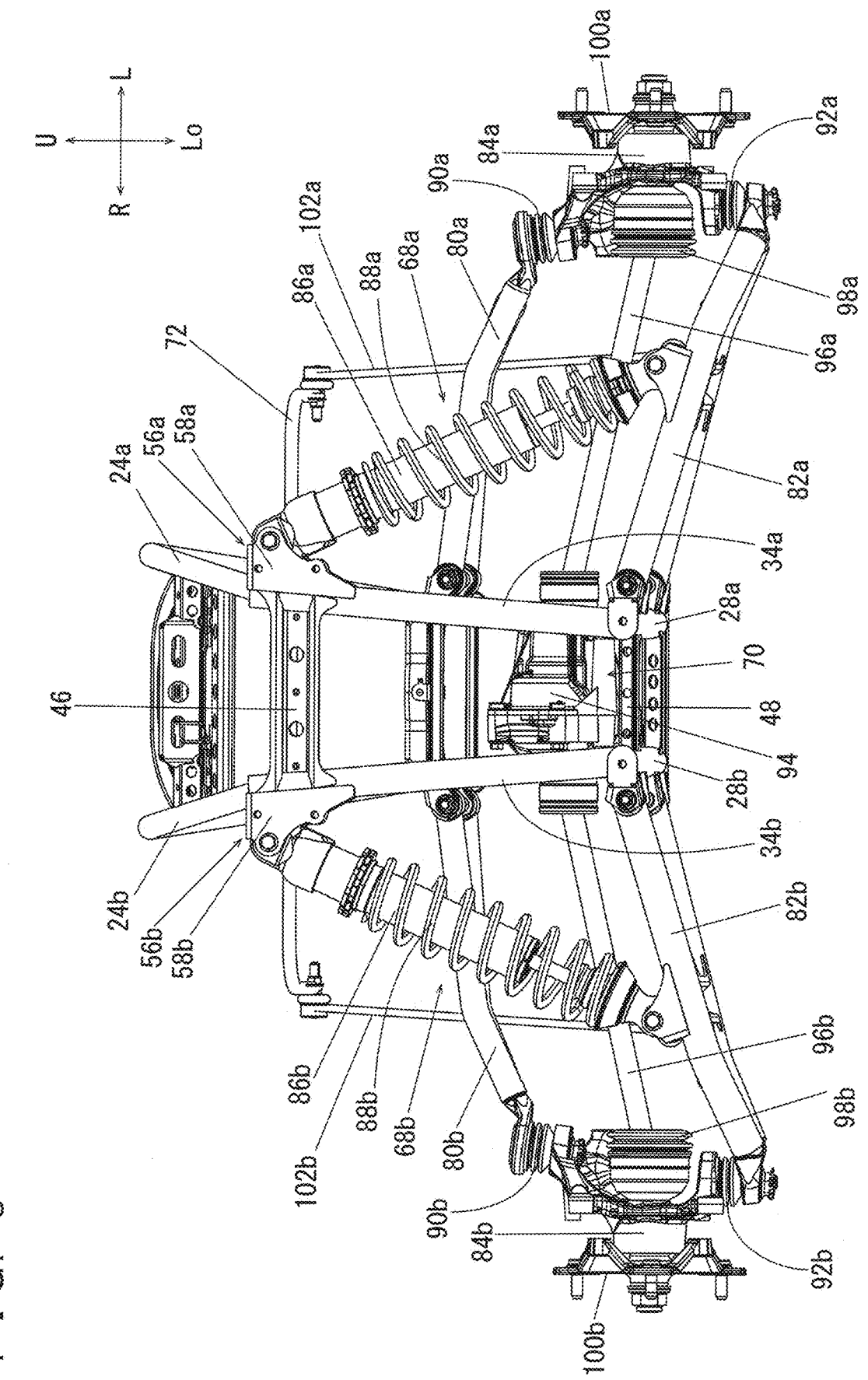
F I G. 6

F I G. 7
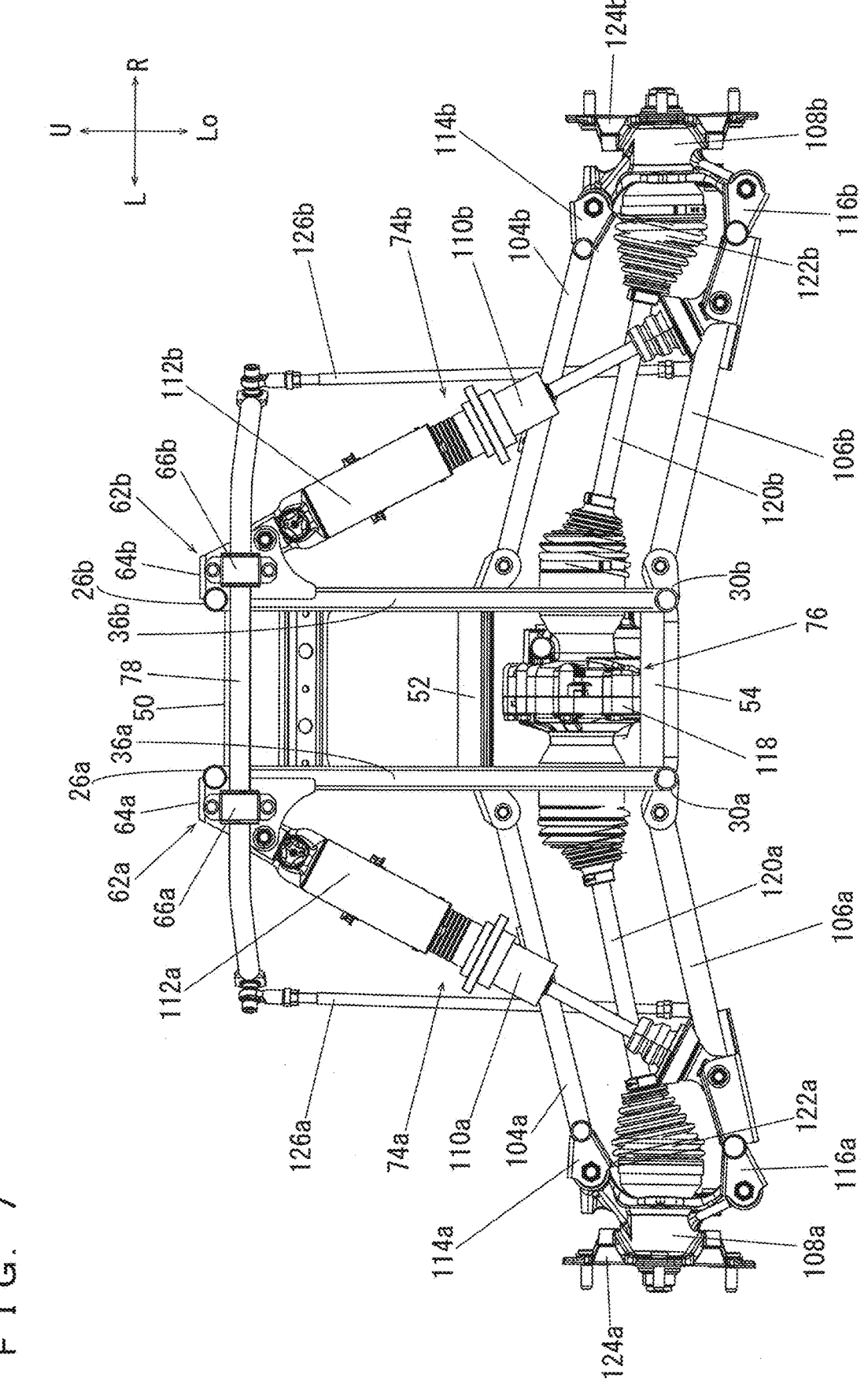

F I G. 8
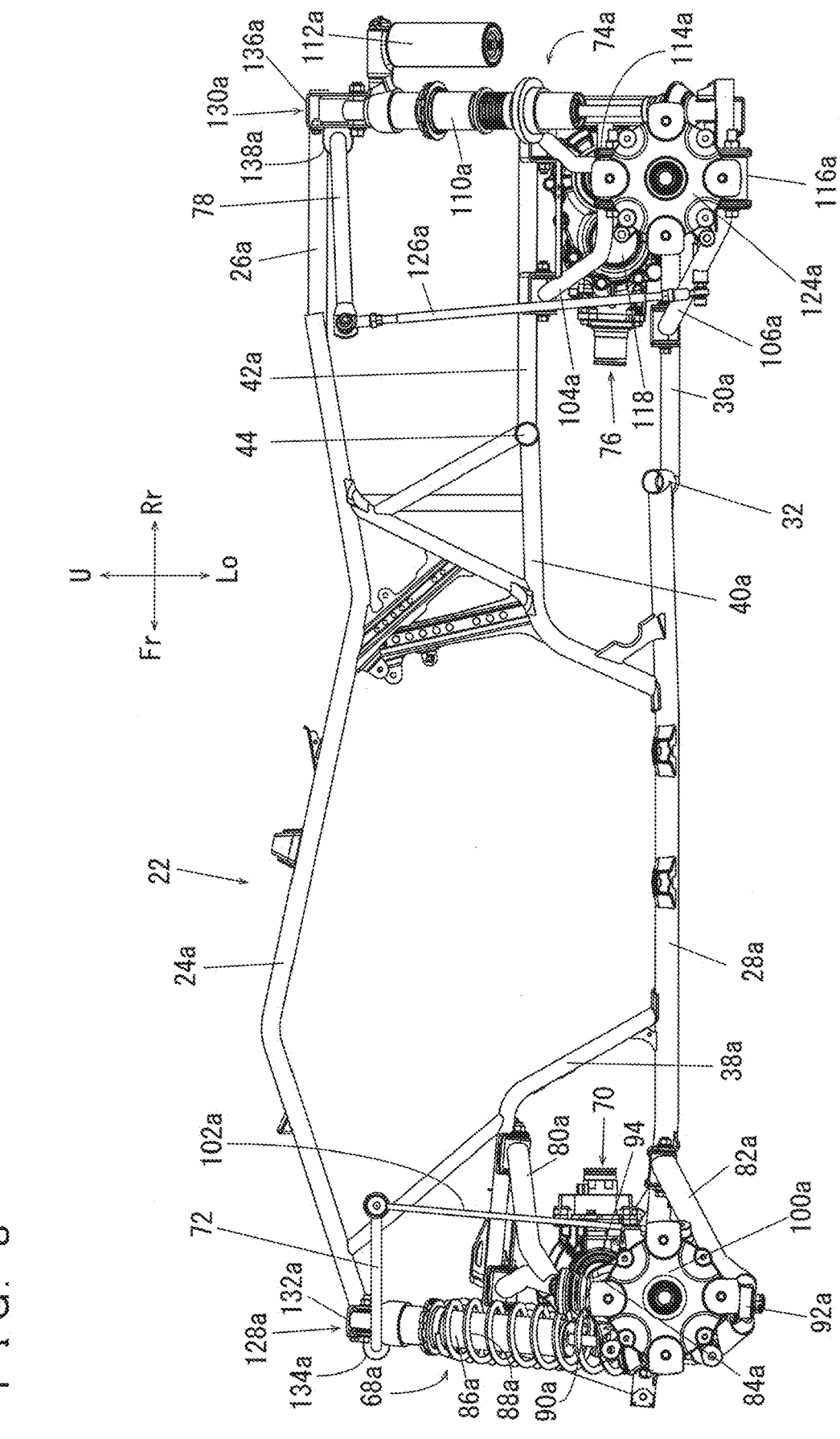

F I G. 9
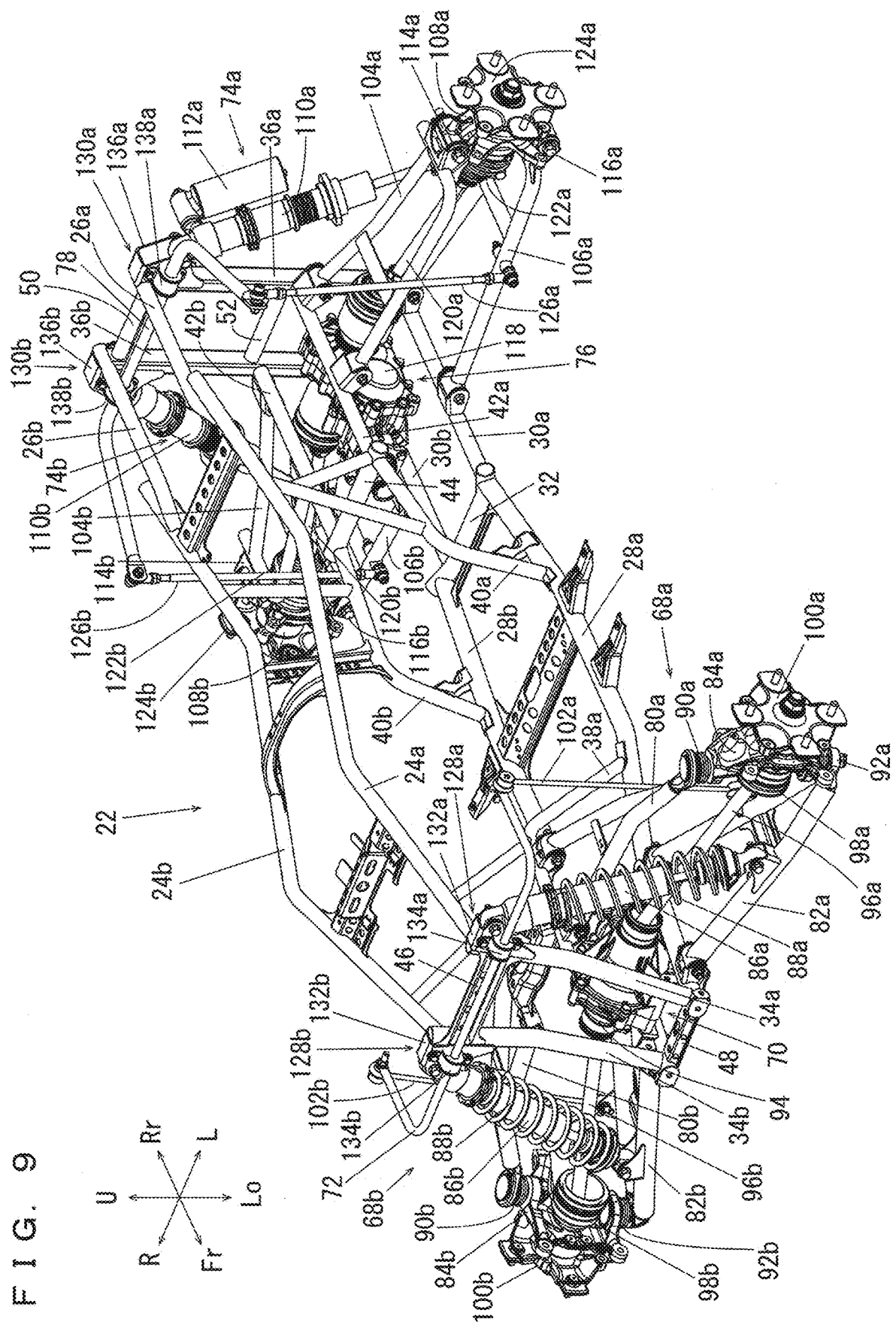

F I G .  1 0
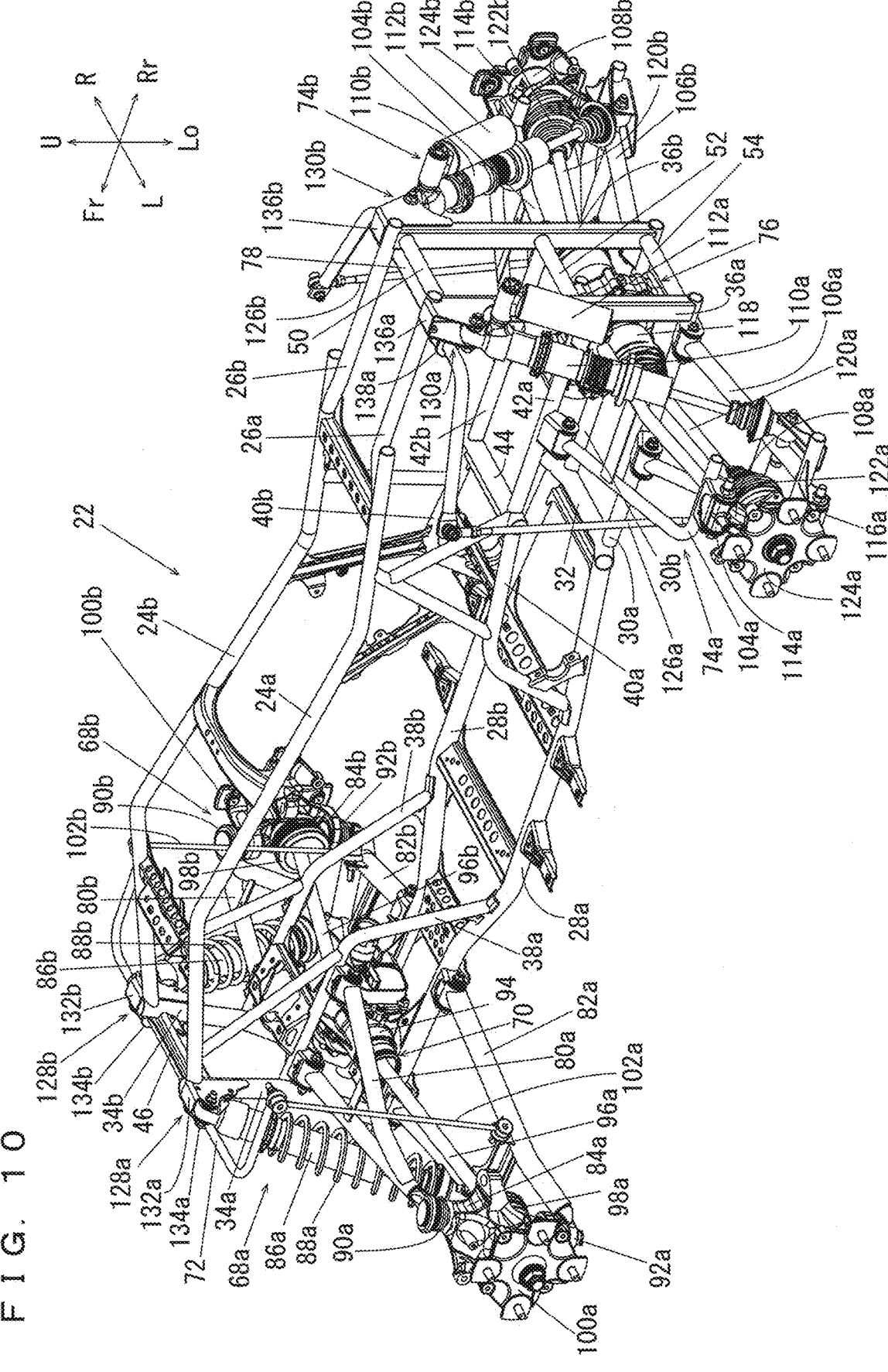

F I G . 1 2
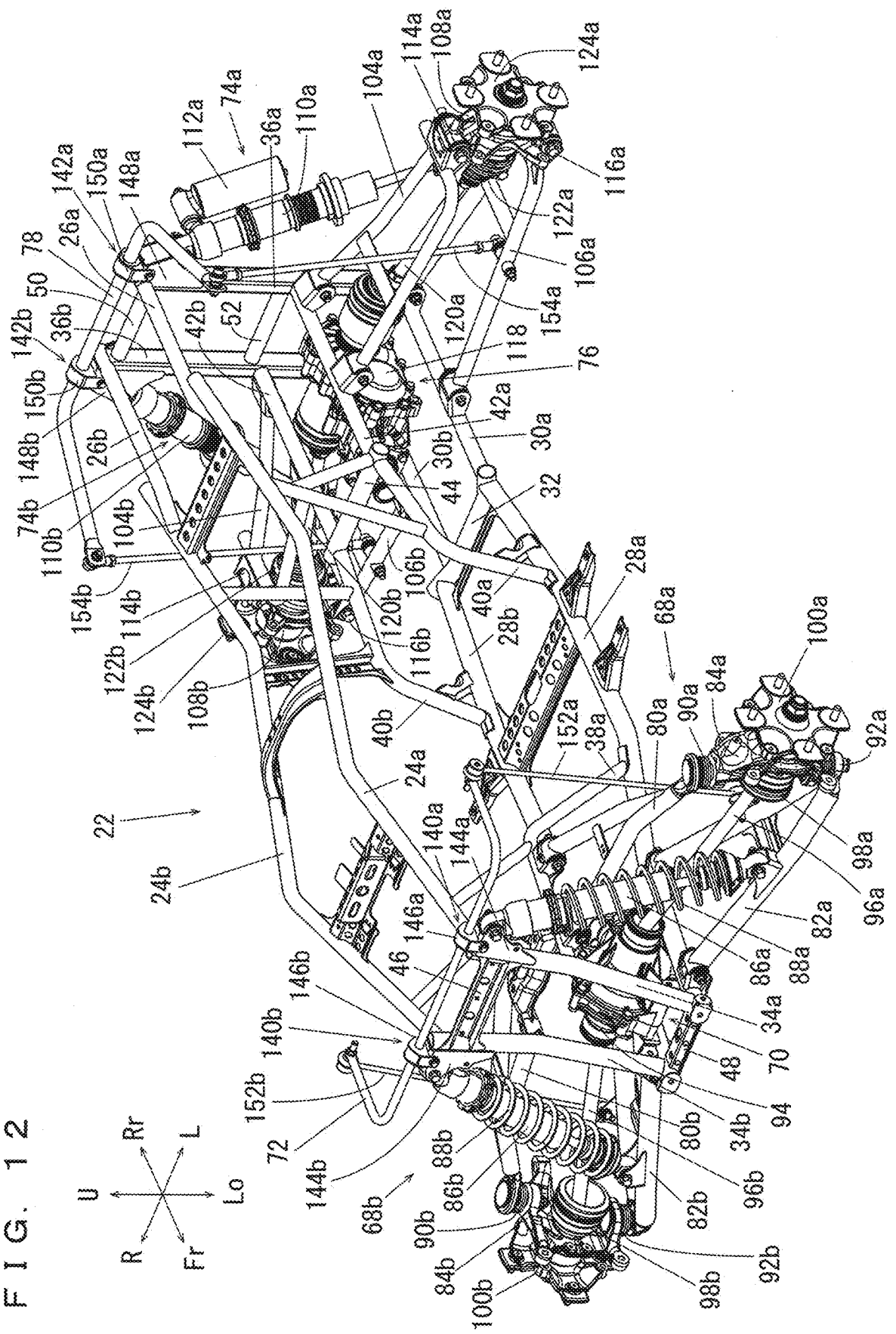

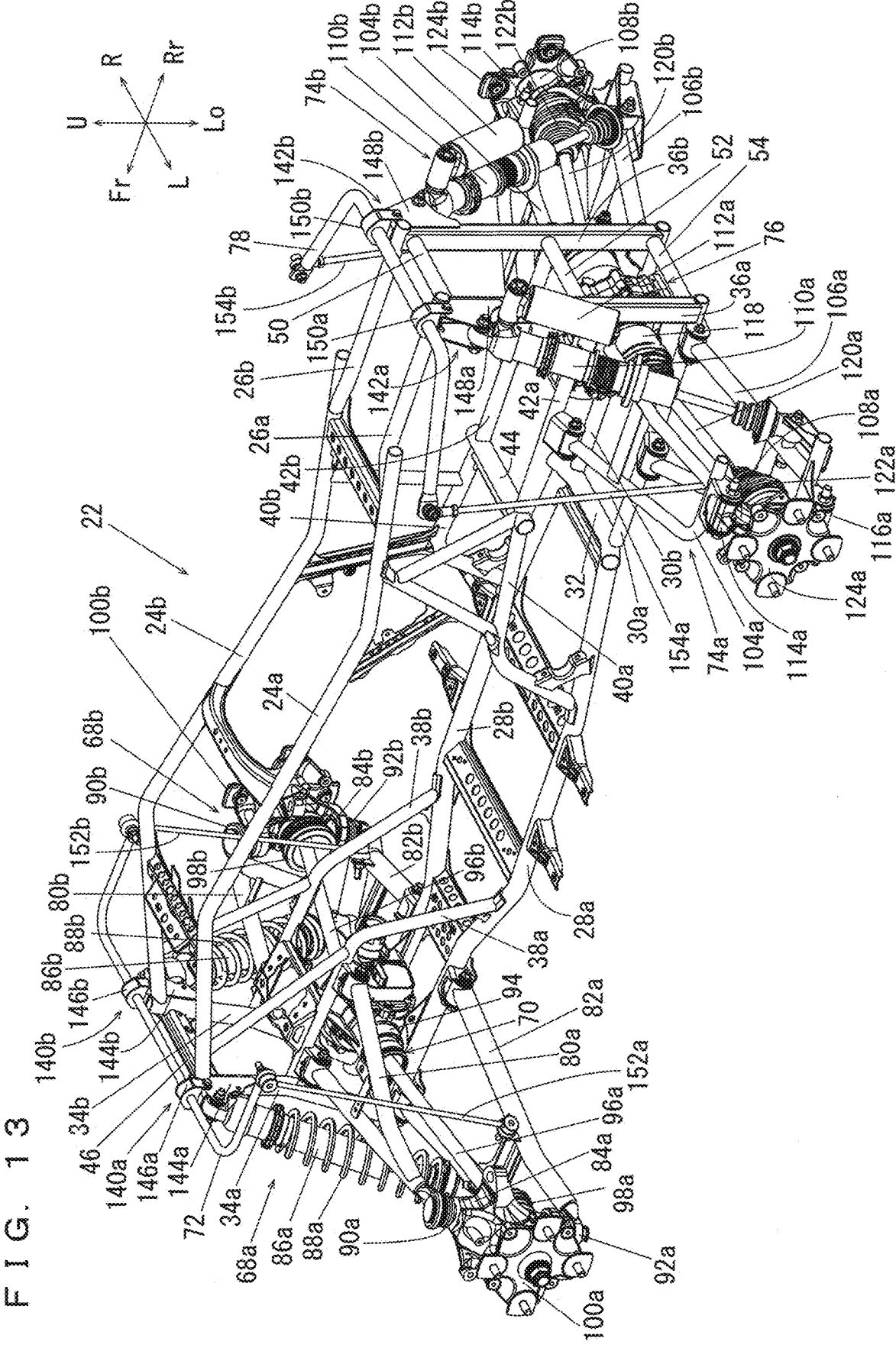
F I G.   1 3

VEHICLE

CROSS REFERENCE TO RELATED APPLICATIONS

This application claims the benefit of priority to Japanese Patent Application No. 2021-124626 filed on Jul. 29, 2021. The entire contents of this application are hereby incorporated herein by reference.

BACKGROUND OF THE INVENTION

1. Field of the Invention

The present invention relates to vehicles, and more specifically to an ATV (All-Terrain Vehicle) and the like.

2. Description of the Related Art

As an example of conventional techniques of this kind, U.S. Patent Application Publication No. 2007/0193813 discloses an ATV. As shown in FIG. 9 of U.S. Patent Application Publication No. 2007/0193813, in the ATV, an upper end portion of the IRS (Independent Rear Suspension) and a stabilizer are supported by a chassis.

However, according to the U.S. Patent Application Publication No. 2007/0193813, the upper end portion of the IRS is supported at a portion of the chassis extending in a left-right direction; the stabilizer, on the other hand, is supported at a portion of the chassis extending in a fore-aft direction; and further, the upper end portion of the IRS and the stabilizer are supported at a distance from each other. There is room for further study and improvement on how to support the IRS and the stabilizer with high rigidity in the chassis.

SUMMARY OF THE INVENTION

Preferred Embodiments of the Present Invention provide vehicles each able to support the suspension and the stabilizer with high rigidity in the body frame.

According to a preferred embodiment of the present invention, a vehicle includes a pair of wheels, a body frame including a first frame extending in a fore-aft direction, and a second frame connected to the first frame and extending downward, a pair of suspensions located between the pair of wheels and the body frame to suspend the pair of wheels, and a stabilizer pivotably supported by the body frame to connect the pair of suspensions to each other. The pair of suspensions each include a shock absorber. The stabilizer and a first end of each shock absorber are supported by the body frame adjacent to a connection between the first frame and the second frame.

In a preferred embodiment of the present invention, the stabilizer and the first end of each shock absorber are supported by the body frame adjacent to the connection between the first frame and the second frame which extends downward from the first frame, i.e., adjacent to a location which has enhanced rigidity resulting from the connection between the first frame and the upper portion of the second frame. Therefore, it is possible to support each first end of the shock absorbers such that each first end of the suspensions and the stabilizer are supported with high rigidity by the body frame and able to withstand a heavy load. As described, preferred embodiments of present invention provide vehicles each able to support the suspension and the stabilizer with high rigidity in the body frame.

Preferably, the vehicle further includes a bracket located adjacent to the connection between the first frame and the second frame to support the first end of the shock absorber and the stabilizer. In this case, it is possible with the bracket to easily attach the first end of the shock absorber and the stabilizer adjacent to the connection between the first frame and the second frame, and thus increase the efficiency of the frame structure.

Further preferably, the stabilizer extends through a region which is more rearward than each of the shock absorbers. In this case, it is possible to increase the freedom of the body layout ahead of the shock absorbers.

Further preferably, the stabilizer extends through a region which is more forward than each of the shock absorbers. In this case, it is possible to increase the freedom of the body layout behind the shock absorbers.

Preferably, the stabilizer extends through a region which is higher than each of the shock absorbers. In this case, it becomes possible to increase the length of a pair of links which connect two ends of the stabilizer to the pair of suspensions, and therefore, it becomes possible to decrease a swing angle (joint swing angle) of the link at a joint between the link and the stabilizer, i.e., a swing angle of the link in a left-right direction around the joint. As a result, it becomes possible to decrease a lateral force working on the joint. In general, the joint swing angle increases as the wheel travel increases. Preferred embodiments of the present invention effectively reduce the swing angle. Also, the number of parts fixed to the body frame above the upper ends of the shock absorbers is fewer than the number of parts fixed to the body frame below the upper end portions of the shock absorbers. Therefore, it becomes possible to increase the freedom of layout of the stabilizer.

Preferred embodiments of the present invention may be suitable for use in a region of the rear wheels.

Also, preferred embodiments of the present invention may be suitable for use in straddled vehicles.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a side view which shows a vehicle according to a preferred embodiment of the present invention.

FIG. 4 is a front perspective view which shows the preferred embodiment of the present invention in FIG. 3.

FIG. 5 is a rear perspective view which shows the preferred embodiment of the present invention in FIG. 3.

FIG. 6 is a front view which shows the preferred embodiment of the present invention in FIG. 3.

FIG. 7 is a rear view which shows the preferred embodiment of the present invention in FIG. 3.

FIG. 8 is a side view which shows a preferred embodiment of the present invention in which a stabilizer extends through a region that is at a more forward position than each of shock absorbers.

FIG. 9 is a front perspective view which shows the preferred embodiment of the present invention in FIG. 8.

FIG. 10 is a rear perspective view which shows the preferred embodiment of the present invention in FIG. 8.

FIG. 12 is a front perspective view which shows the preferred embodiment of the present invention in FIG. 11.

FIG. 13 is a rear perspective view which shows the preferred embodiment of the present invention in FIG. 11.

DETAILED DESCRIPTION OF THE PREFERRED EMBODIMENTS

Figure 2:
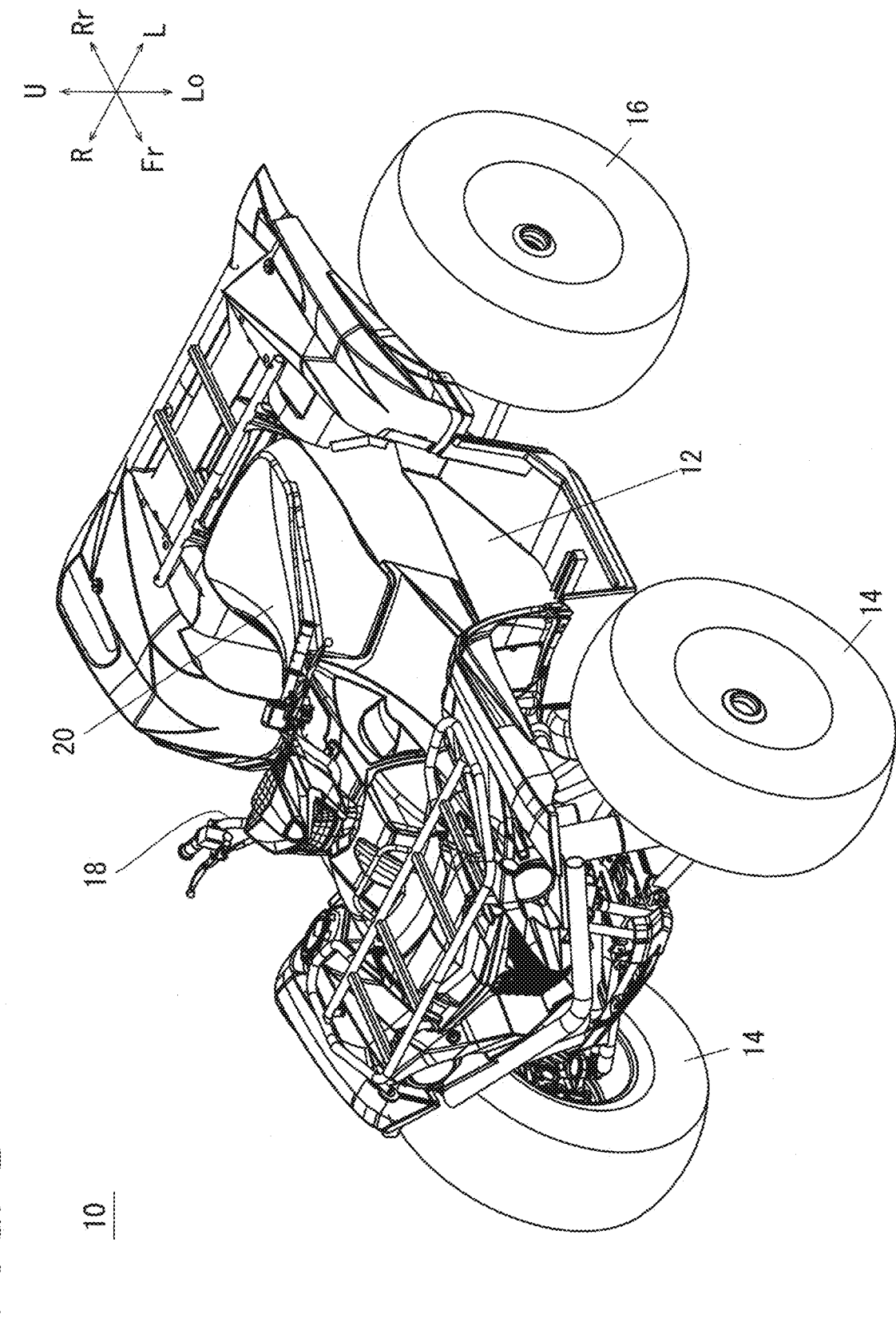
FIG. 2 is a perspective view of the vehicle in FIG. 1.

Hereinafter, preferred embodiments of the present invention will be described with reference to the drawings.

In the drawings, "Fr" indicates forward, "Rr" indicates rearward, "R" indicates rightward, "L" indicates leftward, "U" indicates upward, and "Lo" indicates downward.

Referring to FIG. 1 and FIG. 2, a vehicle 10 according to a preferred embodiment of the present invention is a straddled vehicle, and more specifically a four-wheel ATV that includes a body 12, a pair of front wheels 14, a pair of rear wheels 16, a bar handle 18 in the body 12, and a saddle-style seat 20 in the body 12. Note that FIG. 2 shows only one of the pair of rear wheels 16. The bar handle 18 is located between the pair of front wheels 14 in a plan view, at an intermediate portion in the vehicle's width direction, and in a side view, above the front wheels 14. The saddle-style seat 20 is located at an intermediate portion in the vehicle's width direction, and in a side view, at a higher position than the front wheels 14 and the rear wheels 16, between the front wheels 14 and the rear wheels 16.

Figure 3:
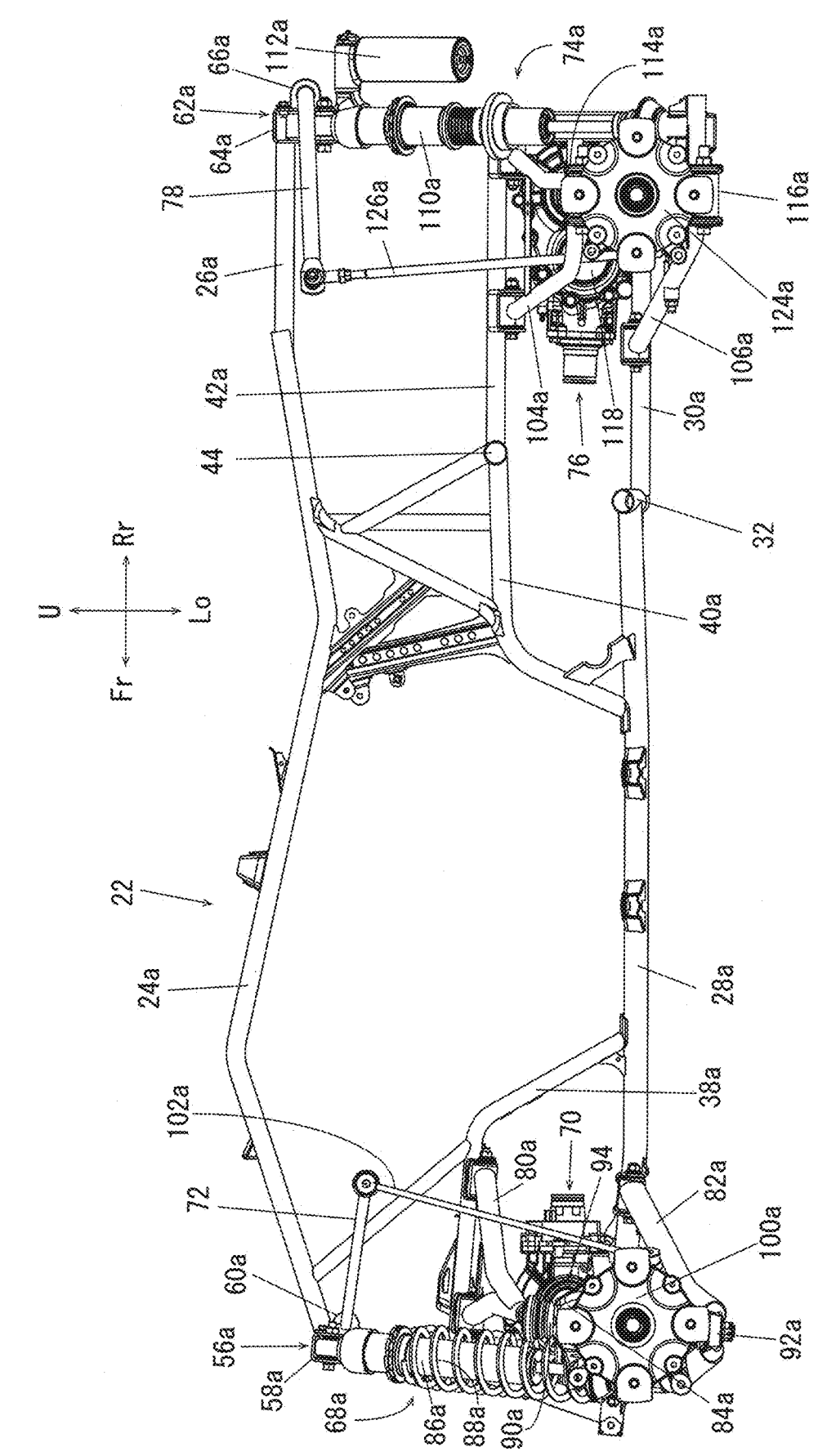
FIG. 3 is a side view which shows a preferred embodiment of the present invention in which a stabilizer extends through a region that is more rearward than each of shock absorbers.

Referring to FIG. 3 through FIG. 5, the body 12 includes a body frame 22.

The body frame 22 includes a pair of upper frame portions 24a, 24b extending in a fore-aft direction and a pair of upper frame portions 26a, 26b extending rearward from the pair of upper frame portions 24a, 24b. Below the pair of upper frame portions 24a, 24b and the pair of upper frame portions 26a, 26b, there are provided a pair of lower frame portions 28a, 28b and a pair of lower frame portions 30a, 30b extending in a fore-aft direction. The pair of lower frame portions 28a, 28b have their rearward end portions connected to forward end portions of the pair of lower frame portions 30a, 30b via a cross member 32.

The pair of upper frame portions 24a, 24b and the pair of lower frame portions 28a, 28b are connected to each other by a pair of front frame portions 34a, 34b extending in an up-down direction respectively. In other words, a forward end portion of the upper frame portion 24a and a forward end portion of the lower frame portion 28a are connected together by the front frame portion 34a while a forward end portion of the upper frame portion 24b and a forward end portion of the lower frame portion 28b are connected together by the front frame portion 34b. Also, the pair of upper frame portions 26a, 26b and the pair of lower frame portions 30a, 30b are connected to each other by a pair of rear frame portions 36a, 36b extending in an up-down direction, respectively. In other words, a rearward end portion of the upper frame portion 26a and a rearward end portion of the lower frame portion 30a are connected together by the rear frame portion 36a while a rearward end portion of the upper frame portion 26b and a rearward end portion of the lower frame portion 30b are connected together by the rear frame portion 36b.

Between the pair of upper frame portions 24a, 24b and the pair of lower frame portions 28a, 28b, a pair of intermediate frame portions 38a, 38b are provided. The pair of intermediate frame portions 38a, 38b have their forward end portions connected to the front frame portions 34a, 34b, respectively. The pair of intermediate frame portions 38a, 38b have their rearward end portions connected to the lower frame portions 28a, 28b, respectively. Also, a pair of intermediate frame portions 40a, 40b are located between the pair of upper frame portions 24a, 24b and the pair of lower frame portions 28a, 28b, while a pair of intermediate frame portions 42a, 42b are located between the pair of upper frame portions 26a, 26b and the pair of lower frame portions 30a, 30b. The pair of intermediate frame portions 42a, 42b are located at a more rearward position than the pair of intermediate frame portions 40a, 40b. The pair of intermediate frame portions 40a, 40b have their rearward end portions connected to forward end portions of the pair of intermediate frame portions 42a, 42b via a cross member 44. The pair of intermediate frame portions 40a, 40b have their forward end portions connected to the lower frame portions 28a, 28b, respectively. The pair of intermediate frame portions 42a, 42b have their rearward end portions connected to the rear frame portions 36a, 36b, respectively.

The pair of front frame portions 34a, 34b have their upper end portions connected to each other by a cross member 46. The pair of front frame portions 34a, 34b have their lower end portions connected to each other by a cross member 48. Also, the pair of rear frame portions 36a, 36b have their upper end portions connected to each other by a cross member 50. The pair of rear frame portions 36a, 36b have their intermediate portions connected to each other by a cross member 52. The pair of rear frame portions 36a, 36b have their lower end portions connected to each other by a cross member 54.

Adjacent or near the connection between the upper frame portion 24a and the front frame portion 34a, a bracket 56a is attached to an upper end portion of the front frame portion 34a. Adjacent or near the connection between the upper frame portion 24b and the front frame portion 34b, a bracket 56b is attached to an upper end portion of the front frame portion 34b. The brackets 56a, 56b include shock absorber support portions 58a, 58b and stabilizer support portions 60a, 60b, respectively. The shock absorber support portions 58a, 58b are attached to upper end portions of the front frame portions 34a, 34b, respectively. The stabilizer support portions 60a, 60b are attached to back surfaces of the shock absorber support portions 58a, 58b, respectively. Preferably, the stabilizer support portions 60a, 60b are, for example, bolted onto the back surfaces of the shock absorber support portions 58a, 58b, respectively. In this way, the shock absorber support portion 58a and the stabilizer support portion 60a are integral with each other, and the shock absorber support portion 58b and the stabilizer support portion 60b are integral with each other. The brackets 56a, 56b are able to support the first end portions of shock absorbers 86a, 86b and a stabilizer 72, which will be described below.

Adjacent or near the connection between the upper frame portion 26a and the rear frame portion 36a, a bracket 62a is attached to an upper end portion of the rear frame portion 36a. Adjacent or near the connection between the upper frame portion 26b and the rear frame portion 36b, a bracket 62b is attached to an upper end portion of the rear frame portion 36b. The brackets 62a, 62b include shock absorber support portions 64a, 64b and stabilizer support portions 66a, 66b, respectively. The shock absorber support portions 64a, 64b are attached to upper end portions of the rear frame portions 36a, 36b, respectively. The stabilizer support portions 66a, 66b are attached to back surfaces of the shock absorber support portions 64a, 64b, respectively. Preferably, the stabilizer support portions 66a, 66b are, for example, bolted onto the back surfaces of the shock absorber support portions 64a, 64b, respectively. In this way, the shock absorber support portion 64a and the stabilizer support portion 66a are integral with each other, and the shock absorber support portion 64b and the stabilizer support portion 66b are integral with each other. The brackets 62a, 62b are able to support the first end portions of shock absorbers 110a, 110b and a stabilizer 78, which will be described below.

Referring to FIG. 3 through FIG. 7, the vehicle 10 further includes a pair of suspensions 68a, 68b which suspend the pair of front wheels 14; a rotation transmission 70 which transmits rotation from an unillustrated engine to the pair of front wheels 14; a stabilizer 72 to connect the pair of suspensions 68a, 68b to each other; a pair of suspensions 74a, 74b which suspend the pair of rear wheels 16; a rotation transmission 76 which transmits rotation from the engine to the pair of rear wheels 16; and a stabilizer 78 to connect the pair of suspensions 74a, 74b to each other. The body frame 22 is supported by the pair of front wheels 14 and the pair of rear wheels 16 via the suspensions 68a, 68b, 74a, 74b. In other words, the pair of suspensions 68a, 68b are located between the pair of front wheels 14 and the body frame 22 in order to suspend the pair of front wheels 14. The pair of suspensions 74a, 74b are located between the pair of rear wheels 16 and the body frame 22 in order to suspend the pair of rear wheels 16. In the present preferred embodiment, the suspensions 68a, 68b, 74a, 74b are provided by a double wishbone type, for example.

The suspensions 68a, 68b are located at a front portion of the body frame 22 while the suspensions 74a, 74b are located at a rear portion of the body frame 22.

The suspension 68a includes an upper arm 80a, a lower arm 82a, a knuckle arm 84a, a shock absorber 86a, and a coil spring 88a.

The upper arm 80a and the lower arm 82a are provided by an A-type arm, for example. The upper arm 80a is supported by the intermediate frame portion 38a pivotably in an up-down direction and is also connected to the knuckle arm 84a via a ball joint 90a. The lower arm 82a is supported at a location that is lower than the upper arm 80a by the lower frame portion 28a pivotably in an up-down direction and is also connected to the knuckle arm 84a via a ball joint 92a. This makes the upper arm 80a and the lower arm 82a pivotable in the up-down direction with respect to the knuckle arm 84a. Also, this makes the knuckle arm 84a pivotable in a fore-aft direction with respect to the upper arm 80a and the lower arm 82a.

The shock absorber 86a has its lower end portion supported by the lower arm 82a pivotably in a left-right direction. The shock absorber 86a has its upper end portion supported by an upper end portion of the front frame portion 34a pivotably in a left-right direction via the shock absorber support portion 58a of the bracket 56a.

The suspension 68b is laid out in a symmetrical manner to the suspension 68a. Its configuration should be clear from the description given above if a letter "a" in the alphanumeric reference symbols of the elements relevant to the suspension 68a is replaced with "b", so the description will not be repeated here.

The rotation transmission 70 includes a differential 94, a pair of drive shafts 96a, 96b, a pair of constant-velocity joints 98a, 98b, an unillustrated pair of axles, and a pair of hubs 100a, 100b.

The differential 94 is located between the suspension 68a and the suspension 68b in the width direction of the vehicle 10, and supported by the body frame 22. The differential 94 is connected to the engine via an unillustrated propeller shaft. The drive shafts 96a, 96b, extending in a left-right direction, connect the differential 94 to the constant-velocity joints 98a, 98b. The constant-velocity joint 98a and a pairing one of the axles are connected to each other, and are rotatably supported by the knuckle arm 84a. The axle has one of the front wheels 14 (left front wheel in the present preferred embodiment) attached thereto via the hub 100a. The constant-velocity joint 98b and a pairing one of the axles are connected to each other, and are rotatably supported by the knuckle arm 84b. The axle has one of the front wheels 14 (right front wheel in the present preferred embodiment) attached thereto via the hub 100b.

The stabilizer 72 has a shape somewhat similar to the letter U, extends through a more rearward region than the shock absorbers 86a, 86b, and is supported by the stabilizer support portions 60a, 60b of the brackets 56a, 56b. This makes the stabilizer 72 pivotably supported by the body frame 22 via the brackets 56a, 56b. The stabilizer 72 has its first end portion connected to the lower arm 82a by a link 102a. The stabilizer 72 has its second end portion connected to the lower arm 82b by a link 102b. In other words, the lower arm 82a of the suspension 68a and the lower arm 82b of the suspension 68b are connected to each other via the stabilizer 72 and the links 102a, 102b.

The suspensions 74a, 74b, the rotation transmission 76, and the stabilizer 78 are configured substantially in the same manner as the suspensions 68a, 68b, the rotation transmission 70, and the stabilizer 72 described above.

The suspension 74a includes an upper arm 104a, a lower arm 106a, a knuckle arm 108a, a shock absorber 110a, an unillustrated coil spring, and a reservoir tank 112a attached to the shock absorber 110a.

The upper arm 104a and the lower arm 106a are provided by an A-type arm, for example. The upper arm 104a is supported by the intermediate frame portion 42a pivotably in an up-down direction, and is connected to the knuckle arm 108a via a connecting portion 114a. The lower arm 106a is supported by the lower frame portion 30a pivotably in an up-down direction at a location lower than the upper arm 104a, and is connected to the knuckle arm 108a via a connecting portion 116a. This makes the upper arm 104a and the lower arm 106a pivotable in the up-down direction with respect to the knuckle arm 108a.

The shock absorber 110a has its lower end portion supported by the lower arm 106a pivotably in a left-right direction. The shock absorber 110a has its upper end portion supported by an upper end portion of the rear frame portion 36a pivotably in a left-right direction via the shock absorber support portion 64a of the bracket 62a.

The suspension 74b is laid out in a symmetrical manner to the suspension 74a. Its configuration should be clear from the description given above if a letter "a" in the alphanumeric reference symbols of the elements relevant to the suspension 74a is replaced with "b", so the description will not be repeated here.

The rotation transmission 76 includes a differential 118, a pair of drive shafts 120a, 120b, a pair of constant-velocity joints 122a, 122b, an unillustrated pair of axles, and a pair of hubs 124a, 124b.

The differential 118 is located between the suspension 74a and the suspension 74b in the width direction of the vehicle 10, and supported by the body frame 22. The differential 118 is connected to the engine via an unillustrated propeller shaft. The drive shafts 120a, 120b, extending in a left-right direction, connect the differential 118 to the constant-velocity joints 122a, 122b. The constant-velocity joint 122a and a pairing one of the axles are connected to each other, and are rotatably supported by the knuckle arm 108a. The axle has one of the rear wheels 16 (left rear wheel in the present preferred embodiment) attached thereto via the hub 124a. The constant-velocity joint 122b and a pairing one of the axles are connected to each other, and are rotatably supported by the knuckle arm 108b. The axle has one of the rear wheels 16 (right rear wheel in the present preferred embodiment) attached thereto via the hub 124b.

The stabilizer 78 has a shape somewhat similar to the letter U, extends through a more rearward region than the shock absorbers 110a, 110b, and is supported by the stabilizer support portions 66a, 66b of the brackets 62a, 62b. This makes the stabilizer 78 pivotally supported by the body frame 22, via the brackets 62a, 62b. The stabilizer 78 has its first end portion connected to the lower arm 106a by a link 126a. The stabilizer 78 has its second end portion connected to the lower arm 106b by a link 126b. In other words, the lower arm 106a of the suspension 74a and the lower arm 106b of the suspension 74b are connected to each other via the stabilizer 78 and the links 126a, 126b.

In the present preferred embodiment, the upper frame portions 24a, 24b, 26a, 26b correspond to the first frame portion. The front frame portions 34a, 34b and the rear frame portions 36a, 36b correspond to the second frame portion.

According to the vehicle 10 described above, the side on the front wheel 14 has a specific arrangement in which the first end portion of the shock absorber 86a and the stabilizer 72 are supported by the body frame 22 adjacent to the connection between the upper frame portion 24a and the front frame portion 34a which extends downward from the upper frame portion 24a, i.e., adjacent to a location which has enhanced rigidity resulting from the connection between the upper frame portion 24a and the upper portion of the front frame portion 34a. Likewise, the first end portion of the shock absorber 86b and the stabilizer 72 are supported by the body frame 22 adjacent to the connection between the upper frame portion 24b and the front frame portion 34b which extends downward from the upper frame portion 24b, i.e., adjacent to a location which has enhanced rigidity resulting from the connection between the upper frame portion 24b and the upper portion of the front frame portion 34b. Therefore, it is possible to support each first end portion of the shock absorbers 86a, 86b such that each first end portion of the suspensions 68a, 68b and the stabilizer 72 are supported with high rigidity by the body frame 22, and able to withstand a heavy load.

As for the side on the rear wheel 16, the first end portion of the shock absorber 110a and the stabilizer 78 are supported by the body frame 22 adjacent to the connection between the upper frame portion 26a and the rear frame portion 36a which extends downward from the upper frame portion 26a, i.e., adjacent to a location which has enhanced rigidity resulting from the connection between the upper frame portion 26a and the upper portion of the rear frame portion 36a. Likewise, the first end portion of the shock absorber 110b and the stabilizer 78 are supported by the body frame 22 adjacent to the connection between the upper frame portion 26b and the rear frame portion 36b which extends downward from the upper frame portion 26b, i.e., adjacent to a location which has enhanced rigidity resulting from the connection between the upper frame portion 26b and the upper portion of the rear frame portion 36b. Therefore, it is possible to support each first end portion of the shock absorbers 110a, 110b such that each first end portion of the suspensions 74a, 74b and the stabilizer 78 are supported with high rigidity by the body frame 22, and able to withstand a heavy load.

It is possible, with the bracket 56a, to easily attach the first end portion of the shock absorber 86a and the stabilizer 72 adjacent to the connection between the upper frame portion 24a and the front frame portion 34a, and easily attach the first end portion of the shock absorber 86b and the stabilizer 72 adjacent to the connection between the upper frame portion 24b and the front frame portion 34b, and thus increase the efficiency of the frame structure. Likewise, it is possible, with the bracket 62a, to easily attach the first end portion of the shock absorber 110a and the stabilizer 78 adjacent to the connection between the upper frame portion 26a and the rear frame portion 36a; with the bracket 62b, to easily attach the first end portion of the shock absorber 110b and the stabilizer 78 adjacent to the connection between the upper frame portion 26b and the rear frame portion 36b; and thus increase efficiency of the frame structure.

The stabilizer 72 extends through a region which is more rearward than the shock absorbers 86a, 86b. This makes it possible to increase the freedom of the body layout ahead of the shock absorbers 86a, 86b. Likewise, the stabilizer 78 extends through a region which is more rearward than the shock absorbers 110a, 110b. This makes it possible to increase the freedom of the body layout ahead of the shock absorbers 110a, 110b.

Preferred embodiments of the present invention may be suitable for use in a region of the rear wheels 16.

Also, preferred embodiments of the present invention may be suitable for use in straddled vehicles.

Next, description will be made of another preferred embodiment of the present invention with reference to FIG. 8 through FIG. 10.

In a preferred embodiment of the present invention, the stabilizer 72 extends through a region which is more forward than the shock absorbers 86a, 86b, and the stabilizer 78 extends through a region which is more forward than the shock absorbers 110a, 110b. In order to do so, the brackets 56a, 56b in the previous preferred embodiments are replaced with brackets 128a, 128b, and the brackets 62a, 62b are replaced with brackets 130a, 130b.

The brackets 128a, 128b include shock absorber support portions 132a, 132b and stabilizer support portions 134a, 134b, respectively. The shock absorber support portions 132a, 132b are attached to upper end portions of the front frame portions 34a, 34b, respectively. The stabilizer support portions 134a, 134b are attached to front surfaces of the shock absorber support portions 132a, 132b, respectively. Preferably, the stabilizer support portions 134a, 134b are, for example, bolted onto the front surfaces of the shock absorber support portions 132a, 132b, respectively. In this way, the shock absorber support portion 132a and the stabilizer support portion 134a are integral with each other, and the shock absorber support portion 132b and the stabilizer support portion 134b are integral with each other.

The brackets 130a, 130b include shock absorber support portions 136a, 136b and stabilizer support portions 138a, 138b, respectively. The shock absorber support portions 136a, 136b are attached to upper end portions of the rear frame portions 36a, 36b, respectively. The stabilizer support portions 138a, 138b are attached to front surfaces of the shock absorber support portions 136a, 136b, respectively. Preferably, the stabilizer support portions 138a, 138b are, for example, bolted onto the front surfaces of the shock absorber support portions 136a, 136b, respectively. In this way, the shock absorber support portion 136a and the stabilizer support portion 138a are integral with each other, and the shock absorber support portion 136b and the stabilizer support portion 138b are integral with each other.

In the present preferred embodiment, the shock absorber support portions 132a, 132b support upper end portions of the shock absorbers 86a, 86b, respectively, and the stabilizer support portions 134a, 134b support the stabilizer 72 which extends through a region that is more forward than the shock absorbers 86a, 86b. Also, the shock absorber support portions 136a, 136b support upper end portions of the shock absorbers 110a, 110b, respectively, and the stabilizer support portions 138a, 138b support the stabilizer 78 which extends through a region that is more forward than the shock absorbers 110a, 110b. With this structure, the link 126a that connects the first end portion of the stabilizer 78 and the lower arm 106a to each other, and the link 126b that connects the second end portion of the stabilizer 78 and the lower arm 106b to each other, are connected respectively to the lower arms 106a, 106b from the outside. All other configurations are identical with those in the previous preferred embodiment, so the description will not be repeated here.

According to a preferred embodiment of the present invention, since the stabilizer 72 extends through a region which is more forward than the shock absorbers 86a, 86b, it becomes possible to increase the freedom of the body layout behind the shock absorbers 86a, 86b. Likewise, since the stabilizer 78 extends through a region which is more forward than the shock absorbers 110a, 110b, it becomes possible to increase the freedom of the body layout behind the shock absorbers 110a, 110b.

Description will now be made of still another preferred embodiment of the present invention with reference to FIG. 11 through FIG. 13.

In a preferred embodiment of the present invention, the stabilizer 72 extends through a region which is higher than the shock absorbers 86a, 86b, and the stabilizer 78 extends through a region which is higher than the shock absorbers 110a, 110b. In order to do so, the brackets 56a, 56b in the previous preferred embodiment shown in FIG. 3 through FIG. 7 are replaced with brackets 140a, 140b, and the brackets 62a, 62b are replaced with brackets 142a, 142b.

The brackets 140a, 140b include shock absorber support portions 144a, 144b and stabilizer support portions 146a, 146b, respectively. The shock absorber support portions 144a, 144b are attached to upper end portions of the front frame portions 34a, 34b, respectively. The stabilizer support portions 146a, 146b are attached to upper surfaces of the shock absorber support portions 144a, 144b, respectively. Preferably, the stabilizer support portions 146a, 146b are, for example, bolted onto the upper surfaces of the shock absorber support portions 144a, 144b, respectively. In this way, the shock absorber support portion 144a and the stabilizer support portion 146a are integral with each other, and the shock absorber support portion 144b and the stabilizer support portion 146b are integral with each other.

The brackets 142a, 142b include shock absorber support portions 148a, 148b and stabilizer support portions 150a, 150b, respectively. The shock absorber support portions 148a, 148b are attached to upper end portions of the rear frame portions 36a, 36b, respectively. The stabilizer support portions 150a, 150b are attached to upper surfaces of the shock absorber support portions 148a, 148b, respectively. Preferably, the stabilizer support portions 150a, 150b are, for example, bolted onto the upper surfaces of the shock absorber support portions 148a, 148b, respectively. In this way, the shock absorber support portion 148a and the stabilizer support portion 150a are integral with each other, and the shock absorber support portion 148b and the stabilizer support portion 150b are integral with each other.

Also, the links 102a, 102b are replaced with links 152a, 152b while the links 126a, 126b are replaced with links 154a, 154b. The links 152a, 152b are longer than the links 102a, 102b, respectively, while the links 154a, 154b are longer than the links 126a, 126b, respectively.

In a preferred embodiment of the present invention, the shock absorber support portions 144a, 144b support upper end portions of the shock absorbers 86a, 86b, respectively, and the stabilizer support portions 146a, 146b support the stabilizer 72 which extends through a region that is higher than the shock absorbers 86a, 86b. Also, the shock absorber support portions 148a, 148b support upper end portions of the shock absorbers 110a, 110b, respectively, and the stabilizer support portion 150a, 150b support the stabilizer 78 which extends through a region that is higher than the shock absorbers 110a, 110b. All other configurations are identical with those in the previous preferred embodiment shown in FIG. 3 through FIG. 7, so the description will not be repeated here.

According to a preferred embodiment of the present invention, since the stabilizer 72 extends through a region which is higher than the shock absorbers 86a, 86b, it becomes possible to increase the length of the pair of links 152a, 152b which connect two end portions of the stabilizer 72 to the pair of suspensions 68a, 68b. Therefore, it becomes possible to decrease a swing angle (joint swing angle) of the link 152a at a joint between the link 152a and the stabilizer 72, and a swing angle of the link 152b at a joint between the link 152b and the stabilizer 72. As a result, it becomes possible to decrease a lateral force working on each joint. Likewise, since the stabilizer 78 extends through a region which is higher than the shock absorbers 110a, 110b, it becomes possible to increase the length of the pair of links 154a, 154b which connect two end portions of the stabilizer 78 to the pair of suspensions 74a, 74b. Therefore, it becomes possible to decrease a swing angle of the link 154a at a joint between the link 154a and the stabilizer 78, and a swing angle of the link 154b at a joint between the link 154b and the stabilizer 78. As a result, it becomes possible to decrease a lateral force working on each joint. In general, the joint swing angle increases as the wheel travel increases. Preferred embodiments of the present invention effectively reduce the swing angle.

Also, the number of parts fixed to the body frame 22 above the upper end portions of the shock absorbers 86a, 86b is fewer than the number of parts fixed to the body frame 22 below the upper end portions of the shock absorbers 86a, 86b. Therefore, it becomes possible to increase the freedom of the layout of the stabilizer 72. Likewise, the number of parts fixed to the body frame 22 above the upper end portions of the shock absorbers 110a, 110b is fewer than the number of parts fixed to the body frame 22 below the upper end portions of the shock absorbers 110a, 110b. Therefore, it becomes possible to increase the freedom of the layout of the stabilizer 78.

It should be noted here that in the preferred embodiments shown in FIG. 3 through FIG. 7, description was made for a case where the stabilizer 72 extends through a region which is more rearward than the shock absorbers 86a, 86b and the stabilizer 78 extends through a region which is more rearward than the shock absorbers 110a, 110b. However, the present invention is not limited to this. Preferred embodiments of the present invention include an arrangement in which either one of the stabilizers 72, 78 extends through a region which is more rearward than the corresponding shock absorber.

In the preferred embodiments shown in FIG. 8 through FIG. 10, description was made for a case where the stabilizer 72 extends through a region which is more forward than the shock absorbers 86a, 86b and the stabilizer 78 extends through a region which is more forward than the shock absorbers 110a, 110b. However, the present invention is not limited to this. Preferred embodiments of the present invention include an arrangement in which either one of the stabilizers 72, 78 extends through a region which is more forward than the corresponding shock absorber.

Figure 11:
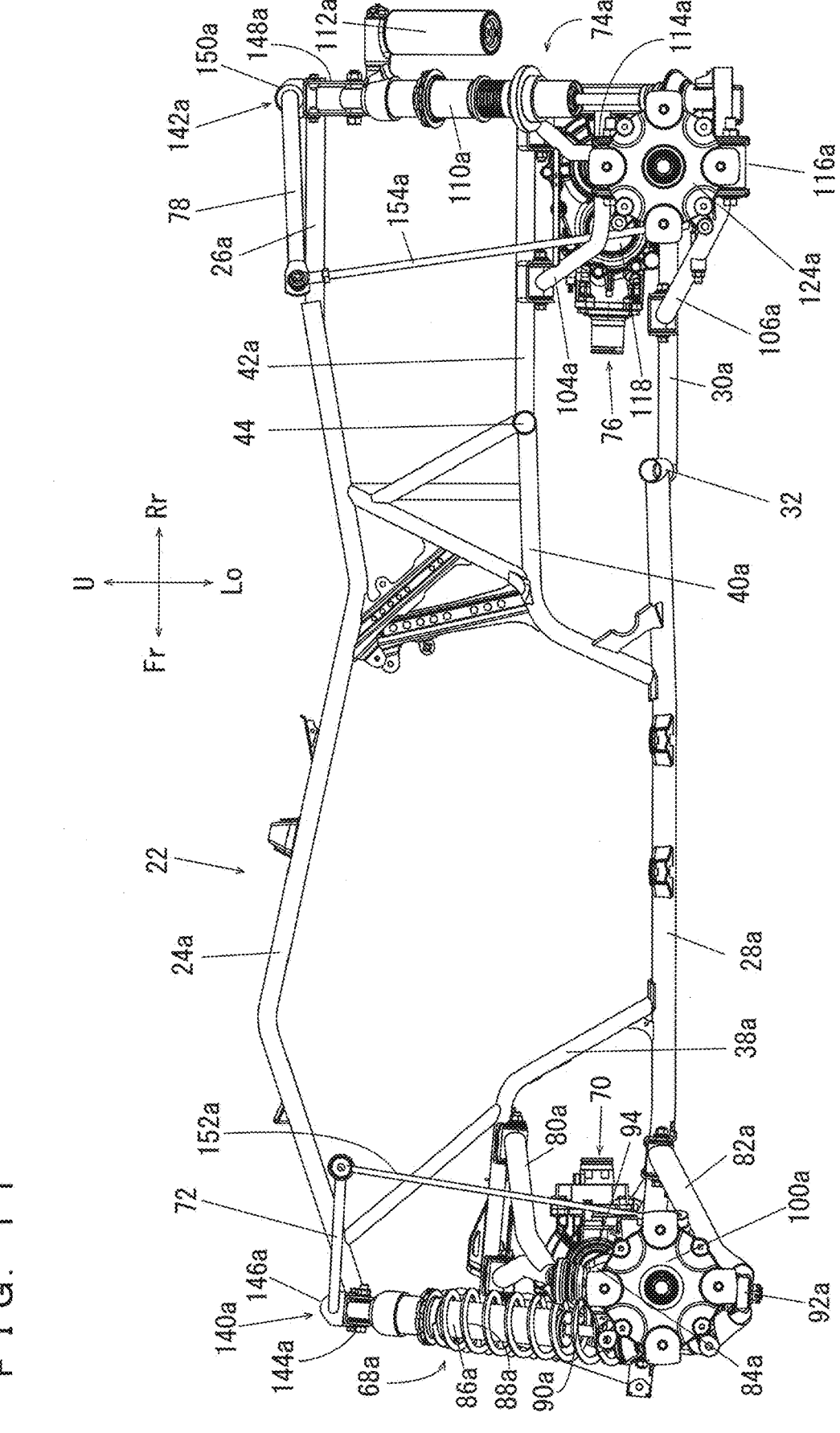
FIG. 11 is a side view which shows a preferred embodiment of the present invention in which a stabilizer extends through a region that is higher than each of shock absorbers.

In the preferred embodiments shown in FIG. 11 through FIG. 13, description was made for a case where the stabilizer 72 extends through a region which is higher than the shock absorbers 86a, 86b and the stabilizer 78 extends through a region which is higher than the shock absorbers 110a, 110b. However, the present invention is not limited to this. Preferred embodiments of the present invention include an arrangement in which either one of the stabilizers 72, 78 extends through a region which is higher than the corresponding shock absorber.

In the preferred embodiments described above, the bracket is designed so that the stabilizer support portion is attached directly to the shock absorber support portion. However, the present invention is not limited to this. The shock absorber support portion and the stabilizer support portion may be integral with each other with a plate-shaped member sandwiched therebetween.

Preferred embodiments of the present invention are also applicable to ROVs (Recreational Off-Highway Vehicles).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
    a pair of wheels;
    a body frame including a first frame extending in a fore-aft direction, and a second frame connected to the first frame and extending downward;
    a pair of suspensions located between the pair of wheels and the body frame to suspend the pair of wheels; and
    a stabilizer pivotably supported by the body frame to connect the pair of suspensions to each other; wherein
    the pair of suspensions each include a shock absorber;
    the stabilizer and a first end of each shock absorber are supported by the body frame adjacent to a connection between the first frame and the second frame; and
    the stabilizer extends through a region which is higher than each of the shock absorbers.

2. The vehicle according to claim 1, further comprising:
    a bracket located adjacent to the connection between the first frame and the second frame to support the stabilizer and the first end of each shock absorber.

3. The vehicle according to claim 1, wherein the pair of wheels include a rear wheel.

4. The vehicle according to claim 1, wherein the vehicle is a straddled vehicle.

* * * * *